Sept. 1, 1925.
S. A. CRONE
1,552,045
EMERGENCY SAFETY SUPPORT FOR BRAKE BEAMS
Filed Aug. 16, 1924   3 Sheets-Sheet 1
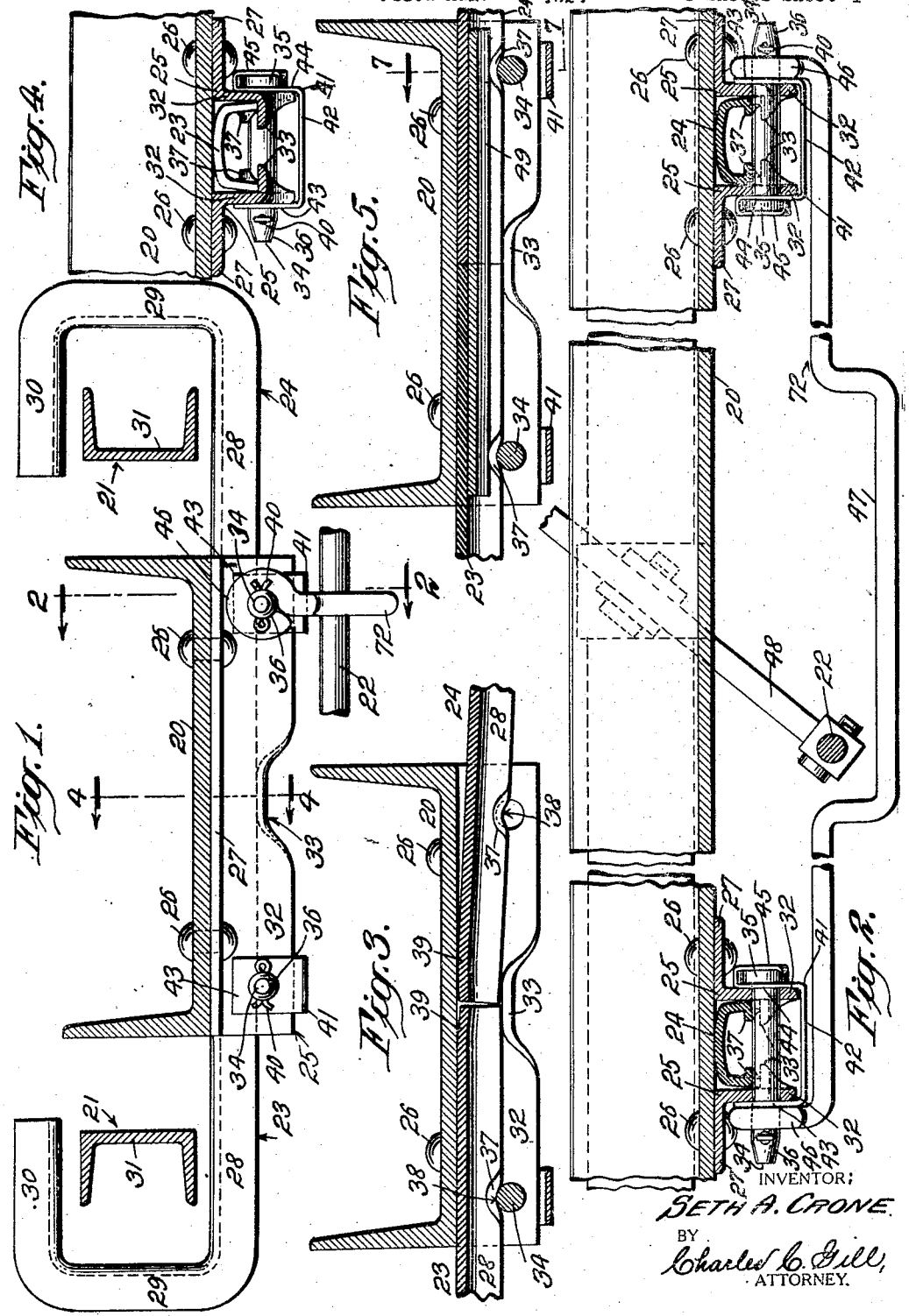

Sept. 1, 1925.
S. A. CRONE
1,552,045
EMERGENCY SAFETY SUPPORT FOR BRAKE BEAMS
Filed Aug. 16, 1924   3 Sheets-Sheet 2
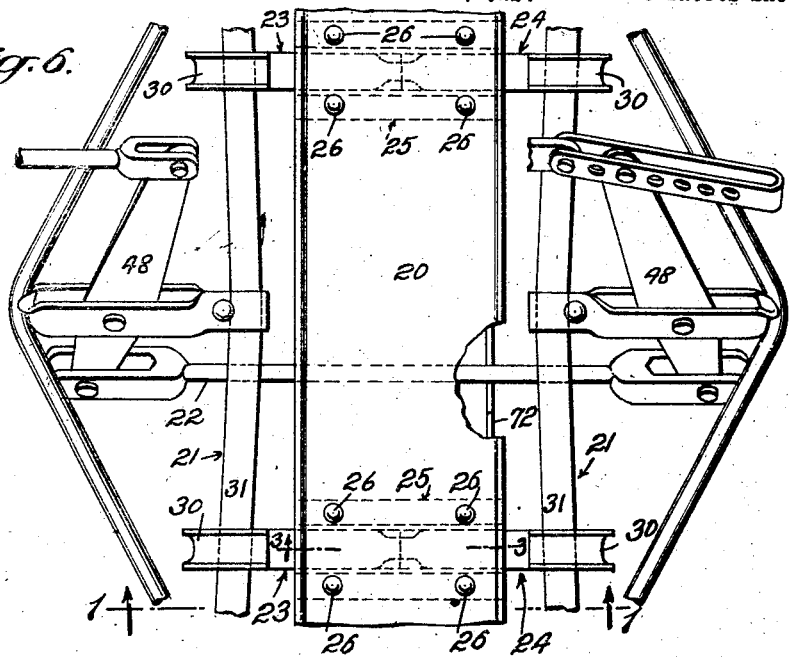
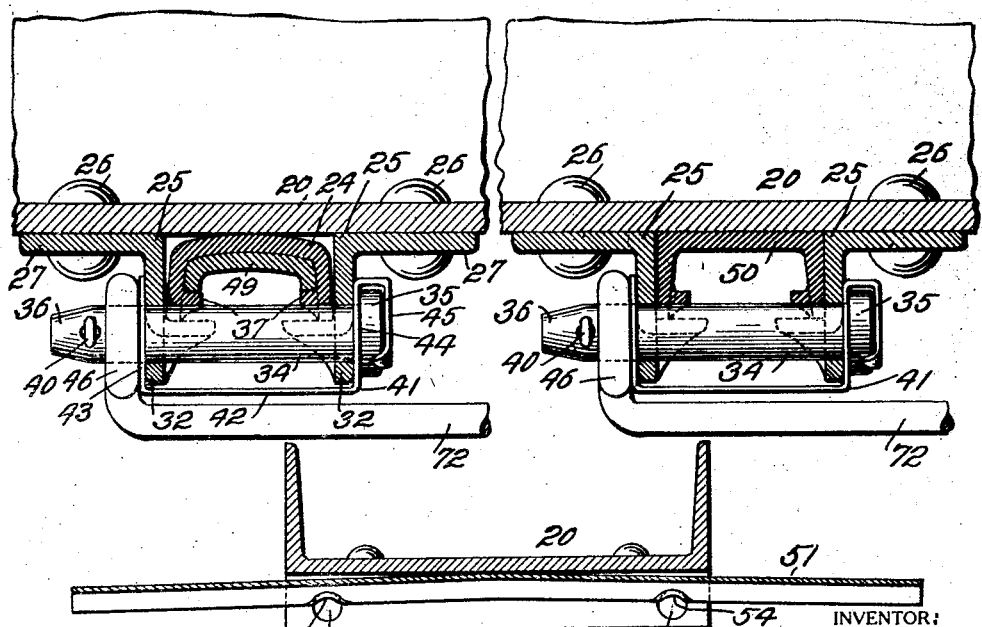
INVENTOR:
SETH A. CRONE.
BY
Charles C. Gill,
ATTORNEY.

Sept. 1, 1925.
S. A. CRONE
EMERGENCY SAFETY SUPPORT FOR BRAKE BEAMS
Filed Aug. 16, 1924     3 Sheets-Sheet 3
1,552,045
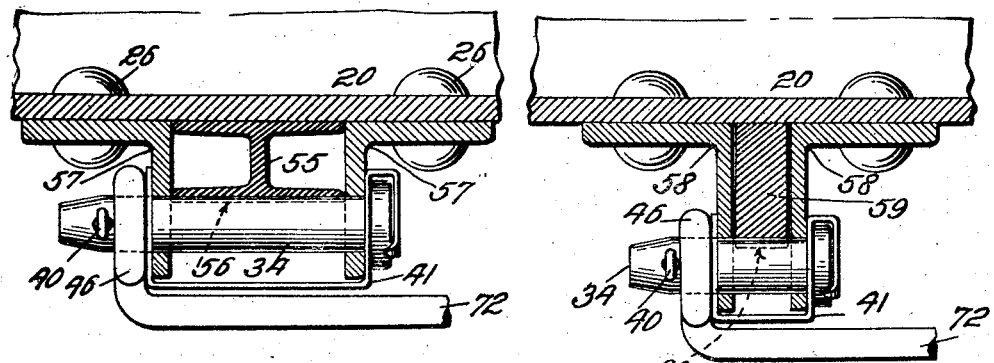
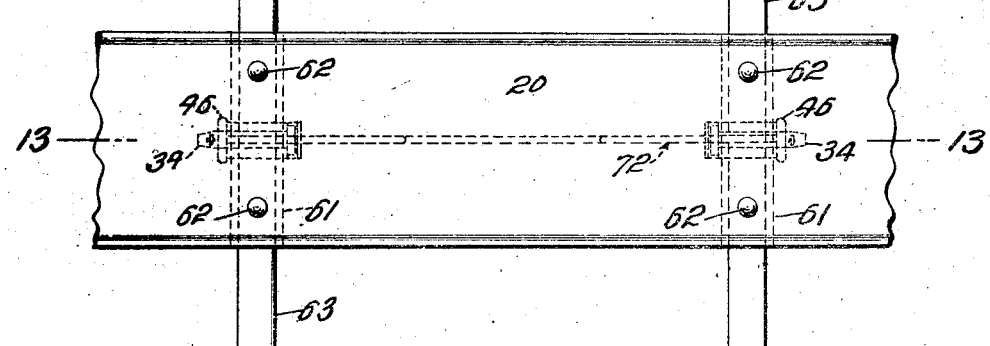
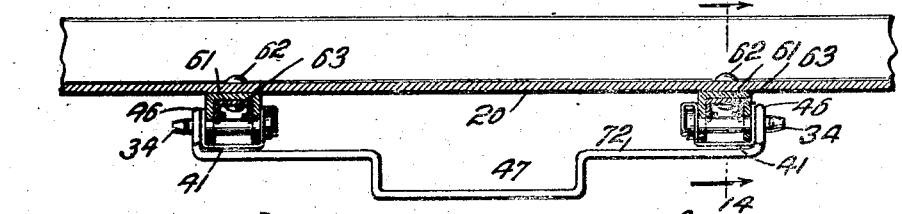
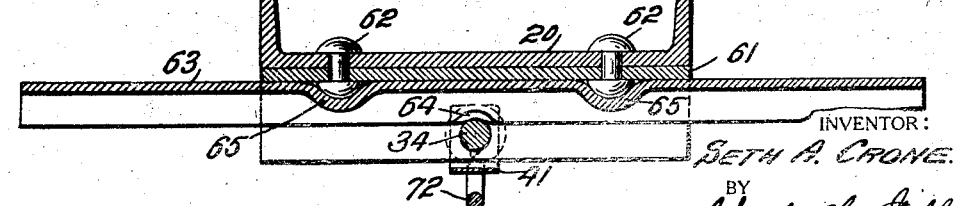
INVENTOR:
SETH A. CRONE.
BY
Charles C. Gill,
ATTORNEY.

Patented Sept. 1, 1925.

1,552,045

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

EMERGENCY SAFETY SUPPORT FOR BRAKE BEAMS.

Application filed August 16, 1924. Serial No. 732,382.

*To all whom it may concern:*

Be it known that I, SETH CRONE, a citizen of the United States, and a resident of East Orange, in the county of Essex and State of New Jersey, have invented certain new and useful Improvements in Emergency Safety Supports for Brake Beams, of which the following is a specification.

The invention pertains to railway brake beams and particularly to novel auxiliary or emergency supporting bars extending below and to receive the brake beams in the event that said beams should become detached from their hangings; one purpose of the invention being to prevent, in case of accident, the brake beams from falling under the wheels, derailment being thus avoided.

A further object of the invention resides in the combination with the auxiliary or emergency bars of means for preventing, in the event of accident to the brake beam hangers, the carrying upwardly by the wheels of the detached brake beams.

A further and important part of the invention resides in the means I have provided for securing the auxiliary or emergency bars to the bottom of the spring plank, these means being adapted to very firmly clamp the auxiliary emergency bars, whether in one piece or two pieces, against the bottom of a usual form of spring plank, and also, when necessary, to permit the convenient removal of said bars from the spring plank, such removal in a speedy and convenient manner being desirable in the event that it should be necessary to unhang a brake beam for repair purposes.

The invention will be fully understood from the detailed description hereinafter presented, reference being had to the accompanying drawings, in which:

Fig. 1 is a vertical longitudinal section through a portion of a car truck equipped with the features of my invention, the section being on the dotted line 1—1 of Fig. 6;

Fig. 2 is a vertical transverse section, partly broken away, through the same, taken on the dotted line 2—2 of Fig. 1;

Fig. 3 is a vertical longitudinal section through a portion of the same and partly broken away, taken on the dotted line 3—3 of Fig. 6, Fig. 3 illustrating the auxiliary emergency or safety bar in two parts instead of one integral part, one of said parts being shown as fully clamped in position, and the other part in its initial introductory position ready to be clamped into fixed engagement with the spring plank by a transverse clamping pin to be hereinafter described;

Fig. 4 is a vertical transverse section, partly broken away, through the spring plank and adjacent parts taken on the dotted line 4—4 of Fig. 1;

Fig. 5 is a view corresponding with Fig. 3, but showing the auxiliary or safety bars in their clamped relation to the spring plank and as being bridged under at their inner adjoining portions by a channel bridge-piece, which is absent from the construction shown in Figs. 1 to 4 inclusive;

Fig. 6 is a top view, partly broken away, of a car truck equipped with the features of my invention shown more fully in Figs. 1 to 4 inclusive;

Fig. 7 is a vertical transverse section on a larger scale through a portion of the car truck and illustrating the construction shown in Fig. 5, the section of Fig. 7 being taken on the dotted line 7—7 of Fig. 5;

Fig. 8 is a vertical transverse section, on a larger scale, through a portion of the car truck, this section corresponding with Fig. 7 but illustrating a modified form of the auxiliary or emergency safety bar;

Fig. 9 is a longitudinal section through a portion of a car truck embodying the features of my invention, and illustrating the auxiliary or emergency bar in one integral piece, said bar being cambered upwardly at its central portion, Fig. 9 illustrating the initial condition of the bar prior to the application thereto of the clamping pins which, when applied serve to bind the bar against the lower surface of the spring plank;

Figs. 10 and 11 are vertical transverse sections corresponding with Figs. 7 and 8, but illustrating further modified forms of the auxiliary or emergency safety bar;

Fig. 12 is a top view, partly broken away, of a spring plank and auxiliary or emergency bars secured thereto, with the use of one clamping pin for each bar, the dotted lines indicating a safety hanger suspended from the clamping pins for use in supporting the bottom connection rod of the car brake mechanism, in the event that the parts supporting or positioning said rod should become displaced;

Fig. 13 is a vertical transverse section through the car truck taken on the dotted line 13—13 of Fig. 12, and Fig. 14 is a vertical longitudinal section through a portion of the same taken on the dotted line 14—14 of Fig. 13.

In the drawings, 20 designates a conventional form of spring plank, 21 portions of inside hung trussed brake beams of usual character, and 22 the bottom connection rod for the brake levers, these parts being of usual or any suitable type.

With reference to Figs. 1, 2, 3, 4 and 6, I would say that the invention resides in the novel auxiliary or emergency bars 23, 24, and in the means for securing these bars in a detachable manner to the spring plank 20, said means comprising two parallel angle bars 25, secured longitudinally of the truck and to the spring plank 20 by means of rivets 26, which extend through the spring plank and through the horizontal flanges 27 of said angle bars.

The bars 23, 24 extend longitudinally at each side of the truck, and said bars are alike in construction except that they extend in opposite directions. The bars 23, 24 are preferably each in the shape of an inverted channel, as shown in Fig. 4, and said bars each comprise in one integral piece a horizontal member 28, a vertical member 29 extending upwardly from the outer end of the member 28, and a horizontal member 30 which extends horizontally and inwardly from the upper end of the member 29 whereby the bars 23, 24 at their outer end portions form yokes or cages within which the compression members 31 of the brake beams are freely held captive, said yokes or cages permitting of the requisite movements of the compression members 31, and, in the event of accident to the brake hangers, preventing said beams from falling to the track or roadbed and also preventing the beams riding upwardly in the event that the brake beams should become detached from their hangers. By forming the bars 23, 24 channel shape in cross-section, I secure great strength in said bars without undue weight of metal.

The parallel angle bars 25 receive between their vertical depending flanges 32 the lower inner end portions of the bars 23, 24, and said flanges 32 at their lower central portions are bent inwardly toward each other to form brackets 33, as shown in Fig. 4, which serve as supports for the adjoining inner end portions of the members 28 of the bars 23, 24. The bars 23, 24 are supported adjacent to the edges of the spring plank 20 and firmly bound in position by clamping pins 34, which extend through aligned apertures formed in the flanges 32 of the angle bars 25 and have on one end a head 35 and at the other end being tapered or wedge-shaped, as at 36. The flanges of the bars 23, 24 located at the pins 34, are flanged inwardly, as at 37, said flanges 37 not only forming extended surfaces to be engaged by the pins 34, but in their formation creating recesses 38 (Fig. 3) receiving the upper surfaces of the pins 34 and serving as locks for securing the bars 23, 24 against endwise movement. The bars 23, 24 fit tightly between the lower surfaces of the spring plank 20 and the brackets 33 and also snugly fit between the flanges 32 of the angle bars 25, and said bars 23, 24 become very firmly secured by means of the pins 34 which firmly force the bars upwardly against the bottom of the spring plank 20. In order to ensure the firm binding of the inner end portions of the members 28 of the bars 23, 24 against the bottom of the spring plank, I curve the upper surfaces of the inner end portions of said members 28, as at 39, and compel the pins 34 to substantially straighten out the curved portions of said members on the application of said pins to position, as I illustrate in Fig. 3, wherein the left hand pin 34 is shown as having been driven to its final position binding the adjacent member 28 against the lower surface of the spring plank, while at the right hand side of Fig. 3 I illustrate the initial position of the bar 24 prior to the application of the right hand pin 34 to position, and at the right hand side of Fig. 3 it will be seen that the inner end of the bar 24 is on the bracket 33 and that the pin when driven into the right hand apertures must act in the nature of a wedge and force the bar 24 upwardly against the spring plank in opposition to the tension afforded by the camber or curve 39, whereby the bar 24 becomes spring-pressed against the spring plank 20 and between said plank and the securing pin 34. By the means and in the manner just described the inner end portions of the members 28 of the bars 23, 24 become very rigidly held, but either bar may be readily removed by driving the pin 34 engaging it from the flanges 32 of the bars 25.

The pins 34 are equipped with usual cotter keys 40, and also with a lock 41 to prevent the escape of the pins in the event that the cotter keys should become broken or detached. The lock 41 is formed of sheet metal and comprises a body portion 42 having at one end an upturned apertured member 43 and at the other end a similar upturned apertured member 44 carrying at its upper end an extension 45 which is finally bent over against the head 35 of the pin 34. In assembling the parts of the lock 41 is applied to the angle bars 25, and thereafter the pin 34 is driven through the said angle bars and through the apertures in the upturned members 43, 44 of the lock, and thereafter the extension 45 is turned against the head of the pin and the cotter key 40 is applied to position. The lock 41 is a very desirable feature for the present invention in view of the fact that the pins 34 are horizontal and subjected in use to considerable vibration. The details of the locks 41 are fully disclosed in my application for Letters Patent therefor, Serial No. 703,692, filed August 2, 1924.

I make use of the pins 34 at opposite sides of the brake beams for securing the safety rod hanger 72 for the lower connection rod 22 of the brake levers, said rod 22 being more fully illustrated in Figs. 2 and 6. The rod 72 is formed at each end with an eye 46 which is engaged upon opposite pins 34 between the cotter keys 40 thereon and the adjacent upturned members 43 of the locks 41, as shown in Fig. 2, and said rod 72 extends transversely across the truck, as shown in Fig. 6, and is formed in its middle portion with the depressed section 47 affording space for the movements of the bottom connection rod 22. The hanger 72 is to receive the lower connection rod 22 in the event that said rod at either end should become detached from the brake levers, said levers being numbered 48 in Fig. 6.

When the auxiliary or emergency bars 23, 24 are formed at their ends to confine the members 31 of the brake beams, said bars should be in two separate pieces, as I have illustrated in Fig. 1, and the bars may be finally secured by the means I have hereinbefore described and which are illustrated in Figs. 1, 2, 3 and 4. I may, however, supplement the securing means for the bars 23, 24 by an underlying bridge-piece or splice 49, as shown in Fig. 5, this bridge or splice being of channel shape and fitting between the side flanges of the bars 23, 24 and crossing the joint between said bars. In the event of employing the bridge-piece or splice 49, the same will be held tightly against the lower surface of the bars 23, 24 by means of the flanges 37 formed on said bars and the pins 34 engaging said flanges.

In Fig. 7 I illustrate on a larger scale and on a different section the construction shown in Fig. 5. In the construction shown in Figs. 5 and 7 I make no change in the angle bars 25, bars 23, 24, pins 34, lock 41 or hanger 72, merely having added in Figs. 5 and 7 the bridge plate or splice 49.

In Fig. 8 is shown the same construction defined in Figs. 1 to 4 inclusive, with the exception that in Fig. 8 the bars 23, 24 in cross-section are of channel shape and have flat upper surfaces instead of the convex upper surfaces shown in Fig. 4, Fig. 8 merely showing a modification in the cross-sectional form of the auxiliary or emergency bars, which, in Figure 8, I number 50.

In Fig. 9 I illustrate the auxiliary or emergency bars as being in one integral piece 51 of channel form and omit from the parallel angle bars (numbered 52 in Fig. 9) the brackets 33 shown in Fig. 4, said brackets not being necessary when the auxiliary or emergency bar is in a single piece. The bar 51 is cambered upwardly at its middle portion, as shown in Fig. 9, and said bar will be secured in position by two of the locking pins 34 which will be driven through the apertures 53 and act against opposite portions of the bar 51 to press said bar in opposition to the camber therein against the bottom of the spring plank 20, whereby said bar 51 will become very securely fastened in position. I recess the bar 51, at 54, to receive the upper surfaces of the pins 34 and cooperate with said pins in locking the bar 51 against endwise movement. The bar 51 may be withdrawn from its operative position by removing the pins 34. Fig. 9 is presented to indicate that the auxiliary or emergency bar may be formed in one piece instead of two pieces, but when the auxiliary or emergency bar is formed with the yoke members shown in Fig. 1 to encompass the compression members 31, said bar may more conveniently be formed in two pieces.

Fig. 10 presents a modification in that the auxiliary or emergency bar 55 differs in cross-section from the channel-shapes hereinbefore referred to. The bar 55 will be grooved across its lower surface, as indicated by the dotted lines 56, to interlock with the upper surface of the pins 34. In Fig. 10 I number the angle bars, which retain the auxiliary or emergency bar, as 57.

In Fig. 11 I number the angle bars 58, and between these bars is held a solid auxiliary or emergency bar 59 whose lower edge will be grooved, as indicated by the dotted line 60, to co-operate with the pins 34 in locking the bar 59 against endwise movement.

In Figs. 12, 13 and 14 I illustrate a further modification wherein, in lieu of employing the angle bars 25, shown in Fig. 4, I replace the same with inverted channel bars 61 secured by rivets 62 to the spring plank and receiving channel-shaped auxiliary or emergency bars 63, which are held in place by the same locking pins 34 hereinbefore referred to. The bars 63 are each in one integral piece of channel shape and secured in position by a single pin 34 instead of with the use of two pins 34. The flanges of the channel bar 63 are recessed, as at 64, to interlock with the pin 34, this being to aid in securing the bar 63 against endwise movement. The upper surface of the channel bar 63 is also recessed, as at 65, to receive the lower heads of the rivets 62 and thereby provide a further means for locking the bar 63 against accidental endwise movement. On the removal of the pin 34 the bar 63 may be readily detached from the spring plank. The single pins 34 employed in the construction shown in Figs. 12, 13 and 14 are equipped with the pin locks 41, hereinbefore described, and are also utilized to support the hanger 72 for the bottom brake lever connection rod 22, this hanger being the same as the hanger shown in Figs. 2 and 6 but being positioned centrally on a transverse line below the spring plank instead, as in Fig. 6, along one edge of said plank.

In all of the forms of my invention, hereinbefore described, the auxiliary or emergency safety bar is secured between parallel depending flanges by means of the locking pins 34, said flanges being riveted to the spring plank and said bar being removable on the withdrawal of said locking pins 34, which are preferably equipped with the pin locks 41 and are adapted for use in supporting the hanger for the bottom brake-lever connection-rod.

In the several forms of my invention the auxiliary or emergency safety bars when released by the locking pins 34 may be immediately lowered from the spring plank and removed to any convenient location; the safety bars may also be conveniently replaced in position and be quickly and positively locked in such position by the means I have hereinbefore described and which will not be prejudicially affected by the vibration of the truck.

What I claim as my invention and desire to secure by Letters Patent, is:

1. In a car truck having a spring plank and inside hung brake-beams, auxiliary or emerging safety bars extending longitudinally below the beams and means removably securing said bars to the spring plank comprising parallel depending flanges riveted to the spring plank and receiving said bars between them and being correspondingly apertured below said bars, and transverse pins driven through said apertures and forcibly binding said bars in position.

2. In a car truck having a spring plank and inside hung brake-beams, auxiliary or emergency safety bars extending longitudinally below the beams and means removably securing said bars to the spring plank comprising parallel depending flanges riveted to the spring plank and receiving said bars between them and being correspondingly apertured below said bars, and transverse pins driven through said apertures and forcibly binding said bars in position, said bars being recessed at their lower sides to interlock with said pins.

3. In a car truck having a spring plank and inside hung brake-beams, auxiliary or emergency safety bars extending longitudinally below the beams and means removably securing said bars to the spring plank comprising parallel depending flanges riveted to the spring plank and receiving said bars between them and being correspondingly apertured below said bars, and transverse pins driven through said apertures and forcibly binding said bars in position, said bars being upwardly cambered below the spring plank and to be straightened out on and by the application of the pins to position.

4. In a car truck having a spring plank and inside hung brake-beams, auxiliary or emergency safety bars extending longitudinally below the beams and means removably securing said bars to the spring plank comprising parallel depending flanges riveted to the spring plank and receiving said bars between them and being correspondingly apertured below said bars, and transverse pins driven through said apertures and forcibly binding said bars in position, said pins having a head on one end and being tapered on the other end.

5. In a car truck having a spring plank and inside hung brake-beams, auxiliary or emergency safety bars extending longitudinally below the beams and means removably securing said bars to the spring plank comprising parallel depending flanges riveted to the spring plank and receiving said bars between them and being correspondingly apertured below said bars, and transverse pins driven through said apertures and forcibly binding said bars in position, said pins having a head on one end and being equipped with a cotter key at the other end and also having a lock for preventing the loss of the pin should the cotter key become displaced, said lock bridging said flanges and being apertured to receive the pin and having an extension to be bent over against the head of the pin.

6. In a car truck having a spring plank and inside hung brake-beams, auxiliary or emergency safety bars extending longitudinally below the beams and means removably securing said bars to the spring plank comprising parallel depending flanges riveted to the spring plank and receiving said bars between them and being correspondingly apertured below said bars, and transverse pins driven through said apertures and forcibly binding said bars in position, said flanges being at points formed with inwardly extending brackets to afford supports for said bars.

7. In a car truck having a spring plank and inside hung brake-beams, auxiliary or emergency safety bars extending longitudinally below the beams and means removably securing said bars to the spring plank, said bars at their outer ends being extended upwardly and then inwardly to form yokes confining the compression members of the beams.

8. In a car truck having a spring plank and inside hung brake-beams, auxiliary or emergency safety bars extending longitudinally below the beams and means removably securing said bars to the spring plank, said bars at their outer ends being extended upwardly and then inwardly to form yokes confining the compression members of the beams, the means securing said bars being depending flanges secured to the spring plank and receiving said bars between them and being correspondingly apertured below said bars, and transverse pins driven through said apertures and forcibly binding said bars in position.

9. In a car truck having a spring plank and inside hung brake-beams, auxiliary or emergency safety bars extending longitudinally below the beams and means removably securing said bars to the spring plank, said bars at their outer ends being extended upwardly and then inwardly to form yokes confining the compression members of the beams, the means securing said bars being depending flanges secured to the spring plank and receiving said bars between them and being correspondingly apertured below said bars, and transverse pins driven through said apertures and forcibly binding said bars in position, said flanges being at points pressed inwardly to form brackets for supporting said bars.

10. In a car truck having a spring plank and inside hung brake-beams, auxiliary or emergency safety bars extending longitudinally below the beams and means removably securing said bars to the spring plank, said bars at their outer ends being extended upwardly and then inwardly to form yokes confining the compression members of the beams, the means securing said bars being depending flanges secured to the spring plank and receiving said bars between them and being correspondingly apertured below said bars, and transverse pins driven through said apertures and forcibly binding said bars in position, said bars being recessed to interlock with said pins, and said flanges being pressed inwardly to form brackets to afford supports for said bars.

11. In a car truck having a spring plank and inside hung brake-beams, auxiliary or emergency safety bars extending longitudinally below the beams and means removably securing said bars to the spring plank, said bars at their outer ends being extended upwardly and then inwardly to form yokes confining the compression members of the beams, said bars at each side of the truck being in two independently removable sections.

12. In a car truck having a spring plank and inside hung brake-beams, auxiliary or emergency safety bars extending longitudinally below the beams and means removably securing said bars to the spring plank, said bars at their outer ends being extended upwardly and then inwardly to form yokes confining the compression members of the beams, said bars at each side of the truck being in two independently removable sections, and the means securing said bars being depending flanges secured to the spring plank and receiving the horizontal members of said bars between them, and transverse pins extending through said flanges below said bars and forcibly binding said bars in position.

13. In a car truck having a spring plank and inside hung brake-beams, auxiliary or emergency safety bars extending longitudinally below the beams and means removably securing said bars to the spring plank, said bars at their outer ends being extended upwardly and then inwardly to form yokes confining the compression members of the beams, said bars at each side of the truck being in two independently removable sections and the means securing said bars being depending flanges secured to the spring plank and receiving the horizontal members of said bars between them, and transverse pins extending through said flanges below said bars and forcibly binding said bars in position, said flanges at their lower middle edge portions being flanged inwardly to form brackets for the support of the adjacent ends of the sections of said bars.

14. In a car truck having a spring plank and inside hung brake-beams, auxiliary or emergency safety bars extending longitudinally below the beams and means removably securing said bars to the spring plank, said bars at their outer ends being extended upwardly and then inwardly to form yokes confining the compression members of the beams, said bars at each side of the truck being in two independently removable sections, and the means securing said bars being depending flanges secured to the spring plank and receiving the horizontal members of said bars between them and transverse pins extending through said flanges below said bars and forcibly binding said bars in position, said bars being of channel formation and being recessed to enter into interlocking engagement with said pins.

15. In a car truck having a spring plank and inside hung brake-beams, auxiliary or emergency safety bars extending longitudinally below the beams, means removably securing said bars to the spring plank comprising parallel depending flanges riveted to the spring plank and receiving said bars between them and being correspondingly apertured below said bars and transverse pins driven through said apertures and forcibly binding said bars in position, and a hanger for the bottom brake connection rod hung on said pins and extending transversely of the truck.

16. In a car truck having a spring plank and inside hung brake-beams, auxiliary or emergency safety bars extending longitudinally below the beams and means removably securing said bars to the spring plank, said bars at each side of the truck being in two independently removable sections, and the means securing said bars being depending flanges secured to the spring plank and receiving the inner end portions of said bars between them, and pins extending through said flanges below said bars and binding said bars in position, said flanges at their lower middle portions being pressed inwardly to form brackets for the support of the adjacent inner ends of the sections of said bars.

17. In a car truck having a spring plank and inside hung brake-beams, auxiliary or emergency safety bars extending longitudinally below the beams and means removably securing said bars to the spring plank, said bars at each side of the truck being in two independently removable sections, and the means securing said bars being depending flanges secured to the spring plank and receiving the inner end portions of said bars between them, and pins extending through said flanges below said bars and binding said bars in position, said flanges at their lower middle portions being pressed inwardly to form brackets for the support of the adjacent inner ends of the sections of said bars, and said sections being transversely recessed to enter into interlocking engagement with said pins.

18. In a car truck having a spring plank and inside hung brake-beams, auxiliary or emergency safety bars extending longitudinally below the beams and means removably securing said bars to the spring plank, said bars at their outer ends being extended upwardly and then inwardly to form yokes confining the compression members of the beams, and said bars at each side of the truck being in two independently removable sections.

19. In a car truck having a spring plank and inside hung brake-beams, auxiliary or emergency safety bars extending longitudinally below the beams, and means removably securing said bars to the spring plank comprising parallel depending flanges riveted to the spring plank and receiving said bars between them and being correspondingly apertured below said bars and pins driven through said apertures and forcibly binding said bars in position, said bars at each side of the truck being in two independently removable sections.

20. In a car truck having a spring plank and inside hung brake-beams, auxiliary or emergency safety bars extending longitudinally below the beams, and means removably securing said bars to the spring plank comprising parallel depending flanges riveted to the spring plank and receiving said bars between them and being correspondingly apertured below said bars and pins driven through said apertures and forcibly binding said bars in position, said bars at each side of the truck being in two independently removable sections and of inverted channel shape in cross-section and containing a bridge-piece crossing the joint between said sections and bound in position by said pins.

Signed at New York city, in the county of New York and State of New York, this 15th day of August A. D. 1924.

SETH A. CRONE.